M. V. SMITH.
PISTON.
APPLICATION FILED MAR. 4, 1911.
1,014,782.
Patented Jan. 16, 1912.
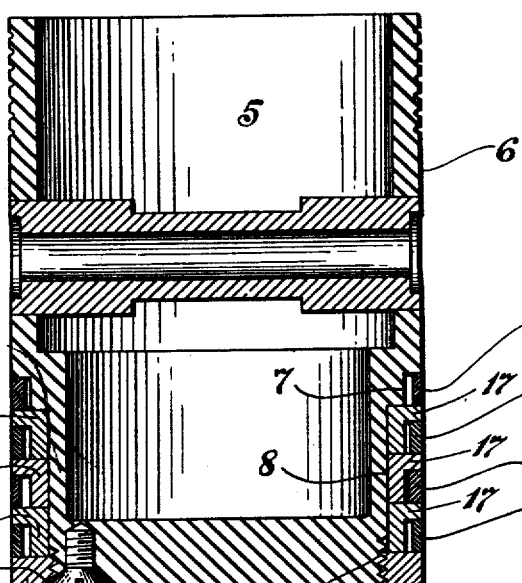
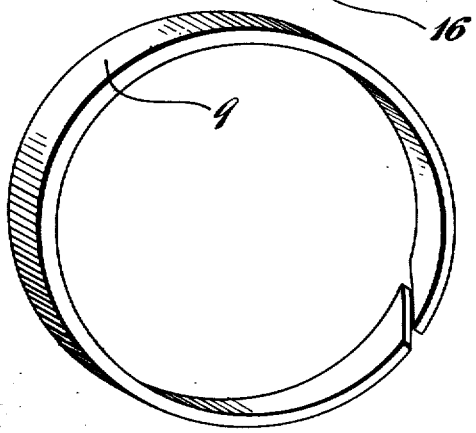
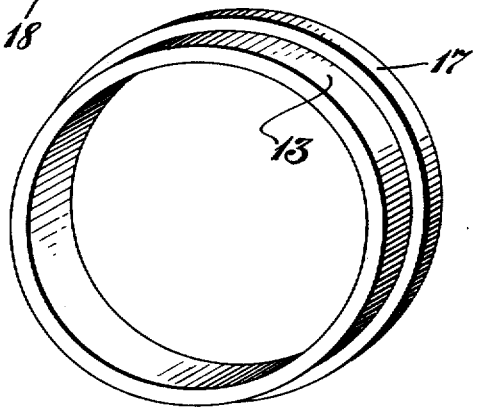
Witnesses:
L. L. Markel.
M. B. Miner.
Inventor:
Martin V. Smith
By his Attorneys,
Sutherland & Anderson.

UNITED STATES PATENT OFFICE.

MARTIN V. SMITH, OF HARTFORD, CONNECTICUT, ASSIGNOR OF ONE-HALF TO JOHN J. DELAHANTY, OF HARTFORD, CONNECTICUT.

PISTON.

1,014,782. Specification of Letters Patent. Patented Jan. 16, 1912.

Application filed March 4, 1911. Serial No. 612,190.

*To all whom it may concern:*

Be it known that I, MARTIN V. SMITH, a citizen of the United States, residing at Hartford, in the county of Hartford and State of Connecticut, have invented certain new and useful Improvements in Pistons, of which the following is a specification.

This invention relates to what I shall for convenience term a piston in view of the fact that the invention is of particular advantage when incorporated in a device of this character, although it can be employed with equal utility in other connections, for instance valves.

One of the primary purposes of the invention is to provide a simple and effective device of this character having means by which the ready and easy assemblage of a packing or packings and the maintenance of said packing or packings in operative relation are assured. The device is preferably, as will hereinafter appear, in the nature of a built up piston or equivalent, and while the packing and packings may vary, they ordinarily consist of a split or divided resilient ring or rings. When a packing of this character is utilized it is evident that I may employ but a single ring, although as a matter of preference there are usually in a piston several of such rings. While as intimated I do not restrict myself to any particular type of packing, the highest advantages are obtained when the packing is in the form of a divided resilient ring. There are pistons now in use which involve such divided resilient rings which are usually seated in grooves milled, cut or otherwise formed in the piston or in the body thereof. Great difficulty is experienced at the present time in properly assembling these rings. It is a fact that when one of them is to be seated in a groove or channel, it has to be opened or spread and then sprung into its groove. This operation is one that requires time and care. By thus opening the rings their resiliency is naturally affected, and when they are positioned some effort has to be expended in correctly fitting them in place. The difficulties attending the assemblage of such packing rings are so obvious that it is probably not necessary for me to go further into detail with respect to the same. I provide a construction wherein all these difficulties are eliminated. The packing rings or even ring, where one is employed, can be quickly assembled, and when they are assembled no adjustment thereof is necessary. Preferably my piston is of such character that the packing rings can be strung thereon, as it were, or slipped over the piston and afterward maintained in operative position.

In the drawings accompanying and forming part of the present specification I have shown in detail one convenient form of embodiment of the invention which to enable those skilled in the art to practice the same will be set forth fully in the following description, while the novelty of said invention will be included in the claims succeeding said description. From this statement it will be evident that I do not restrict myself to such showing as I may depart therefrom in several respects within the scope of my invention included in said claims.

Referring to said drawings: Figure 1 is a vertical section of a piston involving my invention. Fig. 2 is a perspective view of a holding, confining or clamping ring, and, Fig. 3 is a similar view of a packing ring.

Like characters refer to like parts throughout the several figures.

The piston is denoted by 5, and although it may be of any suitable external form, it is shown as being of three diameters, the three portions being denoted respectively by 6, 7 and 8. Said piston is also shown as being hollow.

As already intimated the number of packing rings is not a matter of importance, although in the piston shown there are four of such packing rings, they being denoted commencing with the innermost one by 9, 10, 11 and 12. These packing rings are the same in construction, and they are generally as shown by the ring 9 in Fig. 3 which is just like the other rings, made of some relatively resilient metal divided to provide for the necessary resiliency. As a matter of fact the said packing rings may be just like those customarily used in connection with pistons. In addition to the four packing rings there are four retaining, spacing or clamping rings denoted respectively by 13, 14, 15 and 16. These several rings 13 to 16 inclusive are of continuous form; that is to say they are not split or divided as are the packing rings, and they are preferably made of metal. The three inner rings 13, 14 and 15 are alike in construction, one of them, for instance the ring 13, being shown in Fig. 2. The outer ring 16, however, is different from the rings 13, 14 and 15, as will hereinafter appear, although I might state that the packing and confining rings are slipped over the outer reduced portion of the piston or over the parts 7 and 8 thereof, the ring 16 preferably having a rigid but removable connection of some kind with the piston 5.

The innermost packing ring 9 surrounds the intermediate diametrical portion 7 of the piston having a relatively free fit therearound as is common in this art. Each of the three positioning or confining rings 13, 14 and 15 has at its inner side an annular circumferential flange 17. When the packing 9 has been slipped over the reduced outer portion of the piston and fitted around the part 7 thereof, the ring 13 will be applied by being fitted over said outer reduced portion and its flange 17 will be brought against the ring 9. It will be noted that the first spacing ring 13 fits against the intermediate portion 7 of the piston 5 and that its outwardly extending flange 17 is opposite the portion 6 of greatest diameter, so that in this way there is presented a groove or channel to receive the first packing 9. I might say in passing that the depth of the innermost ring 9 is a trifle less than that of the intermediate diametrical portion 7, by reason of which the ring 13 can fit solidly and firmly against the intermediate portion or the shoulder presented by the outer side thereof. This construction also provides a groove or channel in which the innermost packing ring is free to act. When the first confining ring 13 is thus positioned, the second packing ring 10 is slipped into place until it finds a seat against the flange 17 of the first confining ring 9. The second confining ring 14 is now put into position and until its flange 17 abuts against the first confining ring 13. The relation of the two confining rings 13 and 14 presents between them a channel in which the second packing ring 10 is received, and this second channel is a trifle deeper than the second packing ring 10. The same operation is then repeated with succeeding packing and confining rings until the outermost packing ring 12 has been placed at which time the ring 16 will be connected with the piston.

While there are several ways in which the final or clamping ring 16 can be positioned a screw threaded joint or connection has been found satisfactory. The least diametrical portion 8 of the piston 5 is shown externally threaded at 18 at its outer extremity to receive internal threads on the outermost ring 16, and when the final packing ring 12 has been put in place the final confining or clamping ring 16 will be threaded onto the piston until it abuts against the plain ring 15. While the several rings 13 to 16 inclusive act really as clamping means, they clamp each other but do not clamp the packing rings 9 to 12 inclusive as if they did proper movement of the packing rings would be prevented. They effectually position and maintain in operative relation the several packing rings and they present collectively, together with the piston, channels or grooves in which the packing rings are fitted. It will be apparent at once how easily the packing rings and confining rings can be put in place, a simple stringing operation, as it were, being all that is necessary. While as I intimate the packing rings are preferably metal, this is not essential, although it is very desirable owing to the difficulties which I have pointed out at present accompanying the assemblage of piston rings of this character. It is conceivable also that the outermost ring 16 can be connected detachably with the piston in ways other than by a screw threaded joint. While under ordinary circumstances this type of connection will effectually hold the said outermost ring 16 against accidental displacement, I prefer as an added precaution to key the said outermost ring 16 in place, and a key as 19 meets this requirement. The key 19 is shown consisting of a screw tapped into the outer surface of the piston, the ring 16 having a seat internally thereof to receive the head of the screw 19. When the ring 16 has been turned home, the seat 20 will mate with the laterally cut away portion of the upper part of the hole in which the key or screw 19 is seated. There will, therefore, be presented a circular opening for the head of the screw partially formed in the outer surface of the piston and the remainder or key seat proper 20 in the ring 16. When the screw or key 19 is in final position the outer surface of its head will be preferably substantially flush with the outer surface of the piston, and the outer surface of the ring 16 will also be in the plane of the outer surface of said piston.

What I claim is:

1. A piston having three diameters, a spacing ring encircling the portion of least diameter, bearing against the portion of intermediate diameter and having an outwardly extending flange opposite the portion of greatest diameter to thereby present a packing-receiving groove, and a confining ring for the spacing ring, threaded onto the portion of least diameter, and a headed key also threaded into said portion of least diameter, said confining ring having an opening to receive the head of said key.

2. A hollow piston, a spacing ring encircling said piston, and a confining ring, the confining ring and spacing ring having jointly a packing-receiving groove, and said confining ring also encircling the piston.

3. A hollow piston, a spacing ring encircling said piston, and a confining ring for the spacing ring, the confining ring and spacing ring jointly presenting a packing-receiving groove, the confining ring being threaded onto the piston, and a key threaded into the piston for holding the confining ring in place, the key having a head and the confining ring having an opening to receive said head.

In testimony whereof I affix my signature in presence of two witnesses.

MARTIN V. SMITH.

Witnesses:
F. E. ANDERSON,
HEATH SUTHERLAND.

Copies of this patent may be obtained for five cents each, by addressing the "Commissioner of Patents, Washington, D. C."